Oct. 31, 1939.  T. PFAFF  2,177,743
PRODUCTION OF COILED VITREOUS TUBING
Filed June 9, 1936
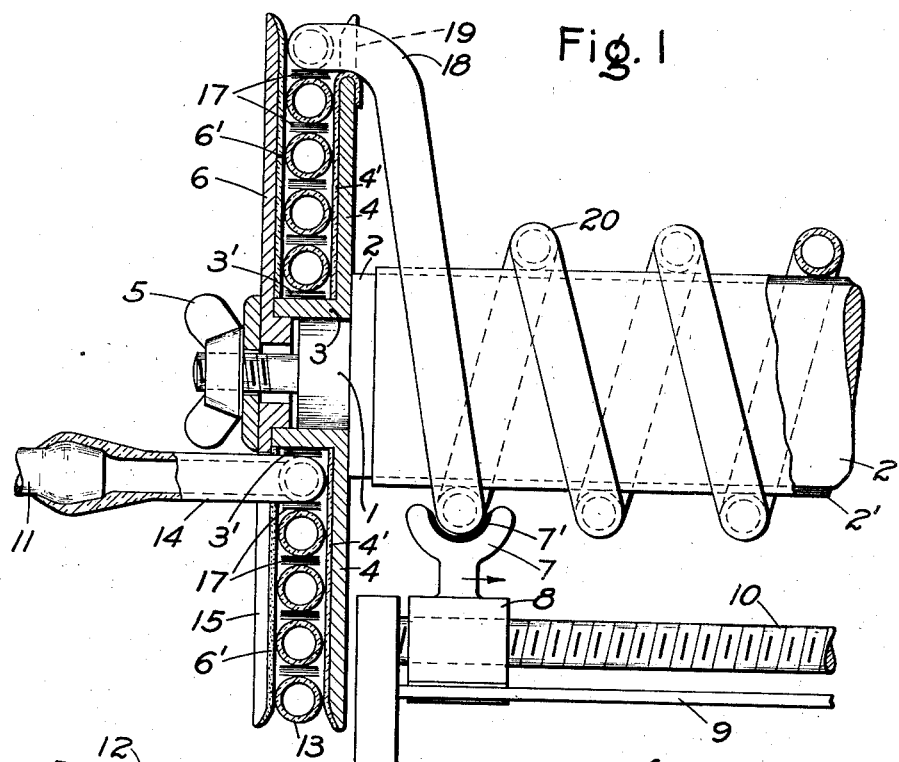
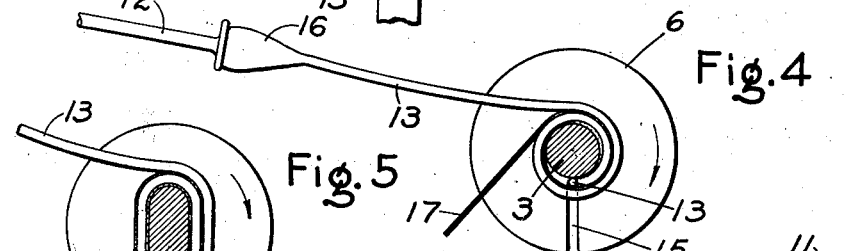
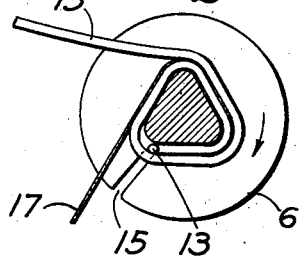
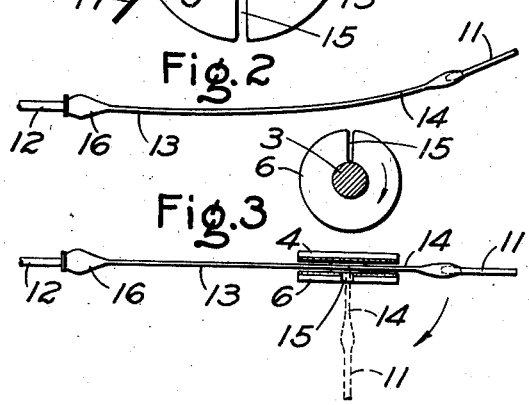
INVENTOR
Theodor Pfaff
BY Harry E. Dunham
ATTORNEY Patented Oct. 31, 1939

2,177,743

UNITED STATES PATENT OFFICE 2,177,743

PRODUCTION OF COILED VITREOUS TUBING

Theodor Pfaff, Weisswasser O.-L., Germany, assignor to General Electric Company, a corporation of New York Application June 9, 1936, Serial No. 84,359
In Germany June 21, 1935

3 Claims. (Cl. 49—22)

The present invention relates to the production of coiled vitreous tubing.

A particular object of the invention is to provide a novel method of producing a coil of glass tubing. Another object of my invention is to provide an improved product by this novel method. Still another object of my invention is to reduce the cost of producing coils of glass tubing. Still other objects and advantages of the invention will appear from the following detailed specification or from an inspection of the accompanying drawing.

The invention consists in the novel steps of the method and in the novel apparatus, as hereinafter set forth and claimed.

Up to the present time, glass tubing has been coiled by first producing a straight glass tube drawn by hand or by means of a machine, and by then bending said straight tube, after it was reheated, by hand or by means of a rotatable form to which the tube was clamped.

I have now discovered that the production of such coiled glass tubing is greatly simplified by a novel combination of the blowing, drawing and forming processes, whereby the finished coil is produced from the glass batch with a single heating. In accordance with my invention a glass parison which is held between a blowpipe and a gathering iron is first partially drawn in the conventional manner to form a short length of tubing of the desired diameter and wall thickness, leaving the greater part of the glass parison still adhering to the gathering iron. Immediately after the drawing of this short length of tube the end of the glass tubing, which still adheres to the blowpipe and which is still plastic, is secured to a winding-form, and then the form is steadily rotated. Air is introduced for the blowing and more glass tubing of the same dimensions is thus continuously drawn from the gathering iron while the mandrel, depending on its form, imparts to it the desired shape, be it a spiral or a helix or shape of serpentine or irregular form. In order to avoid the adhesion of the hot plastic tubing to the form, and in order to facilitate the removal of the shaped glass tubing therefrom, the form or its axle bushing is preferably covered with asbestos prior to the coiling of the tube. In case the glass tubing must be coiled so as to form several layers, one on top of the other, as for the production of spiral tubing, intermediate asbestos layers are preferably wound in therewith so as to prevent adhesion of the superposed turns.

For the purpose of illustrating my invention I have shown a preferred form of apparatus, together with several modifications thereof, in the accompanying drawing, in which Fig. 1 shows a vertical section of a device for carrying out my novel process, Figs. 2 to 4 show, on a smaller scale, the application of the short piece of tubing to a winding-form, and Figs. 5 and 6 show cross sectional views through slightly modified winding-forms.

On the stud 1 of a cylinder 2, which is caused to rotate by any appropriate means, the axle bushing 3 of a disk 4 is pushed, and this disk in combination with the disk 6, which is clamped to the front surface of the bushing 3 by means of the wing nut 5, constitutes the winding-form. The surfaces of the bushing 3 and of both disks 4 and 6, which limit the winding space, are covered with asbestos layers 3', 4' and 6'. The cylinder 2 is provided throughout its entire length with a surrounding asbestos layer 2'. Below the cylinder 2 a fork 7, also covered with asbestos 7', is provided, and the supporting block 8 of that fork is arranged to slide longitudinally along a guide rod 9 parallel to cylinder 2. By means of a screw 10 which goes through the said fork supporting block 8, and which is set in motion simultaneously with the cylinder 2 by means of suitable gears (not shown), the fork 7 is displaced longitudinally as said cylinder 2 rotates.

In the operation of this device a short piece of tubing 13 of the desired diameter and wall thickness is first produced on the blowpipe 11 in the conventional manner by pulling it from the parison 16 which is on the gathering iron 12. This piece of tubing has, for example, a length of about 1 to 2 meters, a diameter of 5 to 20 mm. and a wall thickness of 1 to 3 mm. This short piece of tubing 13 is then, as shown in Fig. 2, secured to the winding-form 4, 6 in such a way that the tubing is in the winding plane. The end of the still plastic tubing 14 which is adjacent to the blowpipe 11 is then bent 90° (as shown in dotted lines in Fig. 3). The bent tubing end 14 to which the blowpipe still adheres is now placed in a slot 15 of the front disk 6 in contact with the asbestos coating 3' of the axle bushing 3. The other end of the tubing remains attached to the gathering iron 12 or to the parison 16 which adheres thereto. The cylinder 2 and the disk-form 3, 4, 6 are now caused to rotate, and the glass tubing 13 which has already been produced is wound on axle bushing 3 between disks 4 and 6 of the winding-form, as shown in Fig. 4. Inasmuch as air is continuously blown into the glass tubing 14 and 13 during the winding process, a glass tubing of the same dimensions is steadily drawn off the glass parison 16 on the gathering iron 12 and is wound spirally over the glass tubing which has already been wound, so that, after a certain number of revolutions of the form, its entire space is filled with a glass-tube spiral. Since the blowpipe is slightly eccentrically located with respect to the axis of the winding form, it is continuously and slightly rotated about its own axis during the blowing and winding process in order to avoid any twisting of the glass tube. In order to prevent the mutual adhesion of the turns during the winding process, an asbestos strip 17 (Fig. 4) is wound in along with the turns of the glass. This strip serves also to maintain an even distance between the individual tubing turns. When the disk form 3, 4, 6, has been completely filled the tubing 18, which is a continuation of the outermost turn, is placed in a small slot 19 of disk 4 and is cut off close behind the disk.

Where desired, however, the remainder of the glass parison on the gathering iron is blown during the same operation by drawing the tubing 18 which protrudes beyond slot 19 over the cylinder 2 into position in the fork 7, 7'. This glass tubing is then wound on the rotating cylinder 2 and forms a helical tube 20. The fork 7, 7', which moves in the direction of the arrow, makes it possible to maintain the same pitch and spacing between the individual turns of tubing. After completing the winding process and separating the glass tube from the gathering iron and blowpipe, the end 18, which connects the spiral and helical sections of the glass tubing, is parted. Then the helically wound glass tubing 20 and the asbestos sleeve 2' are removed laterally from the cylinder 2. The spiral glass tubing 13, which has been produced between the disks 4, 6, can likewise be removed laterally and easily from the form after loosening the wing nut 5 and withdrawing the disk 6.

Where desired several tubing spirals are produced in one operating process and from the same glass parison by arranging on the winding stud 1 several exchangeable disk forms of like or similar shape side by side.

Depending upon the shape of the form which is used, the glass tubing coil is given any desired shape. For instance, in Figs. 5 and 6, by using an oval or triangular bushing an oval or triangular glass spiral coil is produced, respectively. In the same manner the cylindrical form is in some cases made oval or with any desired angular shape, or even conical, where conical glass spirals are to be made.

It is obvious that when a helical glass coil is produced on the cylinder 2 the gathering iron and the fork 7 should be constantly maintained in the same relative position throughout the winding process, either by movement of the gathering iron or by longitudinal movement of the cylinder 2.

While I have shown and described my invention by reference to a particular series of steps and apparatus it is to be understood that my invention is not limited thereto, but that various omissions, substitutions and changes within the scope of the appended claims, may be made, either in the method or the apparatus, without departing from the spirit of my invention.

What I claim as new and desire to secure by Letters Patent of the United States, is:

1. The process of producing vitreous tubing in the form of a coil or the like which comprises gathering a parison of glass between a blowpipe and a gathering iron, drawing a length of tubing of the desired dimension from said parison and bending it into the desired form while it is still plastic.

2. The process of producing vitreous tubing in the form of a coil or the like which comprises gathering a parison of glass between a blow pipe and a gathering iron, drawing a portion of said parison into a tube of the desired diameter and wall thickness, attaching said blowpipe and tube to a rotatable form of the desired configuration, rotating said form to wind up the still plastic tube and to simultaneously draw additional tubing from said parison, and simultaneously increasing the air pressure within said tube through said blow-pipe to keep said tube from collapsing.

3. In apparatus for producing vitreous tubing in the form of a coil or the like, in combination, means to support a parison of vitreous material, means comprising a blowpipe to draw a vitreous tube from said parison, a winding form for said tubing, means to attach said tubing thereto with the blowpipe still attached, and means to rotate said form to wind said tubing thereon and thereby to draw additional tubing from said parison, at exactly the same rate that it is wound on said form.

THEODOR PFAFF.